US007982589B2

(12) United States Patent
Naito et al.

(10) Patent No.: US 7,982,589 B2

(45) Date of Patent: Jul. 19, 2011

(54) WINDOW GLASS CONTROL APPARATUS

(75) Inventors: Utaka Naito, Toyohashi (JP); Takahiro Sumiya, Toyohashi (JP)

(73) Assignee: ASMO Co., Ltd., Shizuoka-pref. (JP)

(*) Notice: Subject to any disclaimer, the term of this patent is extended or adjusted under 35 U.S.C. 154(b) by 372 days.

(21) Appl. No.: 12/219,783

(22) Filed: Jul. 29, 2008

(65) Prior Publication Data

US 2009/0051513 A1 Feb. 26, 2009

(30) Foreign Application Priority Data

Aug. 24, 2007 (JP) ................................ 2007-218728

(51) Int. Cl.
*B60R 25/10* (2006.01)

(52) U.S. Cl. ........................ 340/426.28; 296/155; 49/28

(58) Field of Classification Search ............. 340/426.28; 49/28; 296/155

See application file for complete search history.

(56) References Cited

U.S. PATENT DOCUMENTS 4,283,721 A * 8/1981 Eckert et al. .................. 340/680
4,683,975 A * 8/1987 Booth et al. .................. 180/289
4,687,311 A * 8/1987 Malloy Desormeaux .... 396/285
4,881,101 A * 11/1989 Sumida ........................... 399/82
5,245,217 A * 9/1993 Honma ........................ 307/10.1
5,351,439 A * 10/1994 Takeda et al. ...................... 49/28
5,744,874 A * 4/1998 Yoshida et al. .............. 307/10.1
6,100,658 A * 8/2000 Kume et al. ................... 318/286
6,183,040 B1 * 2/2001 Imaizumi et al. ............. 296/155
6,199,322 B1 * 3/2001 Itami et al. ....................... 49/139
2002/0161501 A1* 10/2002 Dulin et al. ...................... 701/45
2007/0084120 A1* 4/2007 Kobayashi et al. ............... 49/26
2007/0119100 A1* 5/2007 Nakada et al. .................. 49/350
2007/0146209 A1* 6/2007 Touge et al. .................. 343/702
2009/0051513 A1* 2/2009 Naito et al. .............. 340/426.28
2009/0206784 A1* 8/2009 Inoue et al. ................... 318/434

FOREIGN PATENT DOCUMENTS

JP A-8-158741 6/1996
JP A-2006-299568 11/2006

* cited by examiner

*Primary Examiner* — George A Bugg
*Assistant Examiner* — Bradley E Thompson
(74) *Attorney, Agent, or Firm* — Posz Law Group, PLC

(57) ABSTRACT

A microcomputer executes initialization, which causes a memory of the microcomputer to store operational information of a window glass of a door therein in a state where no previous information is stored in the memory. The microcomputer cancels the initialization when an open state signal, which indicates an open state of the door, is outputted from a courtesy switch and/or a door closure. The microcomputer executes the initialization only when a close state signal, which indicates a close state of the door, is outputted from the courtesy switch and/or the door closure.

12 Claims, 4 Drawing Sheets

WINDOW GLASS CONTROL APPARATUS

CROSS REFERENCE TO RELATED APPLICATION

This application is based on and incorporates herein by reference Japanese Patent Application No. 2007-218728 filed on Aug. 24, 2007.

BACKGROUND OF THE INVENTION

1. Field of the Invention

The present invention relates to a closure panel control apparatus, particularly, a closure panel control apparatus, which can sense pinching of an object by the closure panel.

2. Description of Related Art

Lately, a closure panel control apparatus of a vehicle often has a pinching limiting function. Specifically, the closure panel control apparatus senses pinching of an object with a closure panel during a closing movement of the closure panel based on a change in a rotational speed of an electric motor, which drives the closure panel. When the pinching of the object is sensed, the closure panel control apparatus immediately stops the closing movement of the closure panel and executes an opening movement of the closure panel by reversing rotation of the electric motor.

In one exemplary control operation, a threshold value is set for measurement data (e.g., a rotational speed of a drive electric motor of a power window apparatus that drives a window glass to open or close the same), which is measured in response to the load applied to the window glass. Then, the pinching of the object is sensed based on the threshold value. Previously, a technique for updating (learning) the threshold value based on the measurement data has been proposed (see, for example, Japanese Unexamined Patent Publication No. 2006-299568). When the threshold value is updated in the manner described in the previously proposed technique, more reliable detection of the pinching is possible while eliminating the influences of the change in the slide resistance caused by, for example, aging.

According to the technique of Japanese Unexamined Patent Publication No. 2006-299568, in order to eliminate the influence of the change in the slide resistance caused by aging, the learning control operation is executed. In this learning control operation, the speed change at the time of opening/closing movement of the closure panel is stored (learned) in a storage device. Then, a difference between this previous learning data and the current speed data is obtained and is used at the time of determining the pinching of the object.

Thus, it is possible to frequently execute the updating of the learning data, which is used to sense the pinching of the object, and thereby to perform the updating of the learning data in a more realistic manner. Also, in this way, even in a case where an external disturbance is present, the updating of the learning data can be appropriately executed.

However, initialization of the learning data needs to be executed in many situations. That is, at the time of factory shipment or at the time of completion of vehicle repair, the mechanism of the closure panel or the installation state of the closure panel may possibly change or may become different from that of the designing stage.

In view of the above points, the initialization of the learning data is executed, and various techniques for executing the initialization of the learning data have been proposed (see, for example, Japanese Unexamined Patent Publication No. H08-158741). Japanese Unexamined Patent Publication No. H08-158741 teaches the technique for initializing the learning data in view of the case where the load of the electric motor used for driving the window glass due to a change in the installation state of the window glass opening/closing mechanism.

According to this technique, at the time when the initialization is required (time of factory shipment or at the time of completion of vehicle repair), the automatic opening movement of the window glass of the vehicle is executed continuously or intermittently, and the load applied to the motor is sensed. Based on the sensed values, a reference value is created and is stored.

However, according to the technique recited in Japanese Unexamined Patent Publication No. H08-158741, the possibility of erroneous sensing of the pinching cannot be completely eliminated depending on the shape of the vehicle door, to which the closure panel is installed.

That is, for example, in a case of sashless door where a slide resistance of the closure panel differs between the door opening movement and the door closing movement, the speed change to be learned differs between the door open state and the door close state.

Particularly, in the door close state, the moving speed of the window glass is reduced by a weather strip unlike the door open state. Thus, when the learning data is initialized in the door open state, the possibility of erroneous sensing of the pinching cannot be completely eliminated.

Therefore, the initialization of the learning data should be performed in the door close state. However, in the case where the initialization can be executed in both of the door open state and the door close state, the vehicle having the power window apparatus, which is initialized in the door open state at the time of factory shipment or at the time of repair at the automobile dealer, may possibly be given to the customer.

SUMMARY OF THE INVENTION

The present invention addresses the above disadvantage. Thus, it is an objective of the present invention to provide a closure panel control apparatus that drives a closure panel to open or close the same at a door, in which a slide resistance of the closure panel differs between a door open state and a door close state, while implementing an initializing function capable of limiting erroneous sensing of pinching of an object with the closure panel.

To achieve the objective of the present invention, there is provided a closure panel control apparatus for a vehicle, which includes a drive means, a door state sensing means, a storage means, a pinching sensing means and a control means. The drive means is for driving a closure panel, which is provided at a door of the vehicle, to open and close the closure panel. The door state sensing means is for sensing an open state or a close state of the door. The storage means is for storing operational information of the closure panel. The pinching sensing means is for sensing pinching of an object by the closure panel based on the operational information, which is stored in the storage means. The control means is for controlling the drive means. The control means includes an initialization processing means for executing initialization, which causes the storage means to store the operational information therein in a state where no previous information is stored in the storage means. The initialization processing means cancels the initialization when an open state signal, which indicates the open state of the door, is outputted from the door state sensing means. The initialization processing means executes the initialization only when a close state signal, which indicates the close state of the door, is outputted from the door state sensing means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
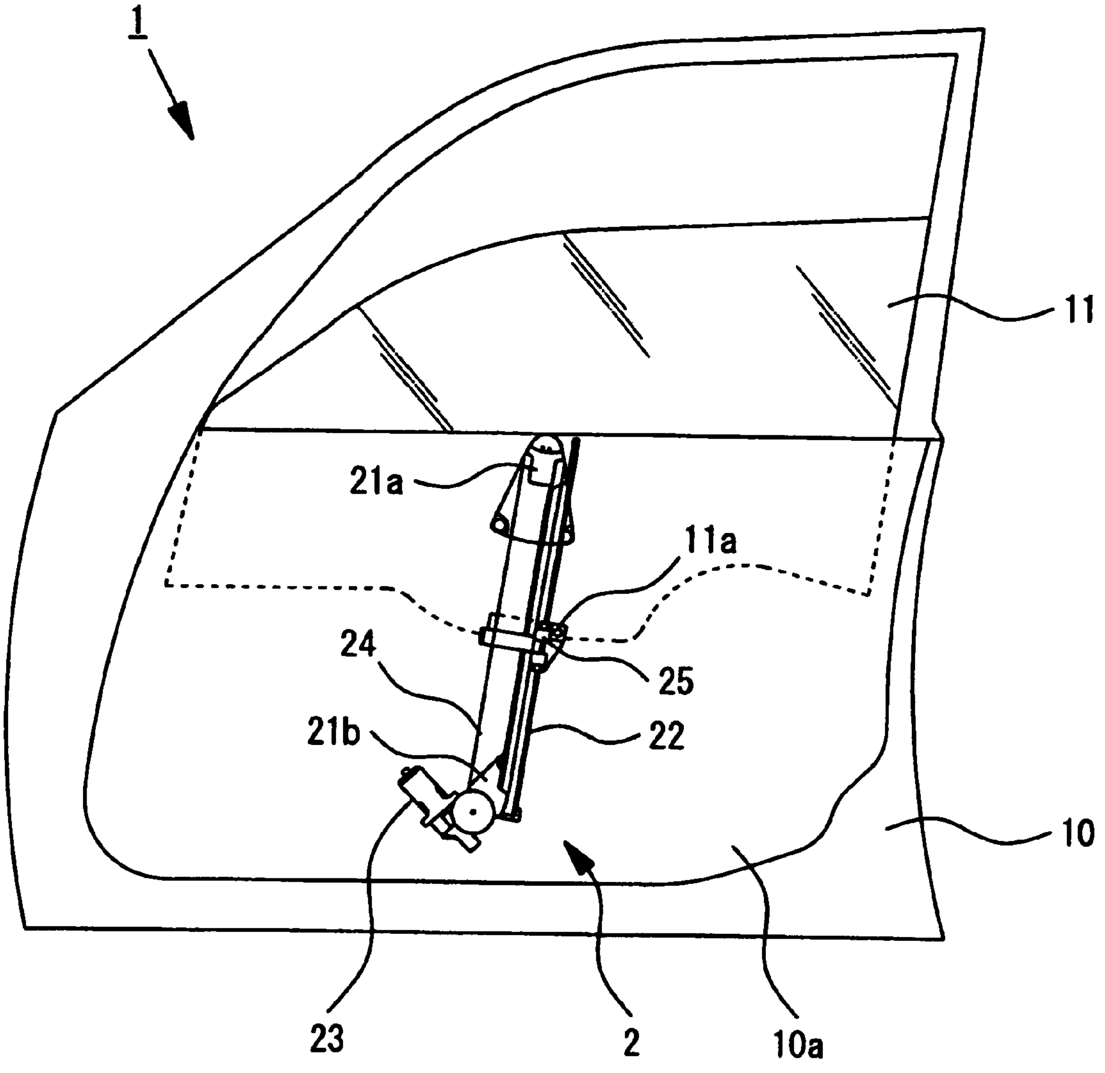
FIG. 1 is a schematic view of a power window apparatus according to an embodiment of the present invention.
Figure 2:
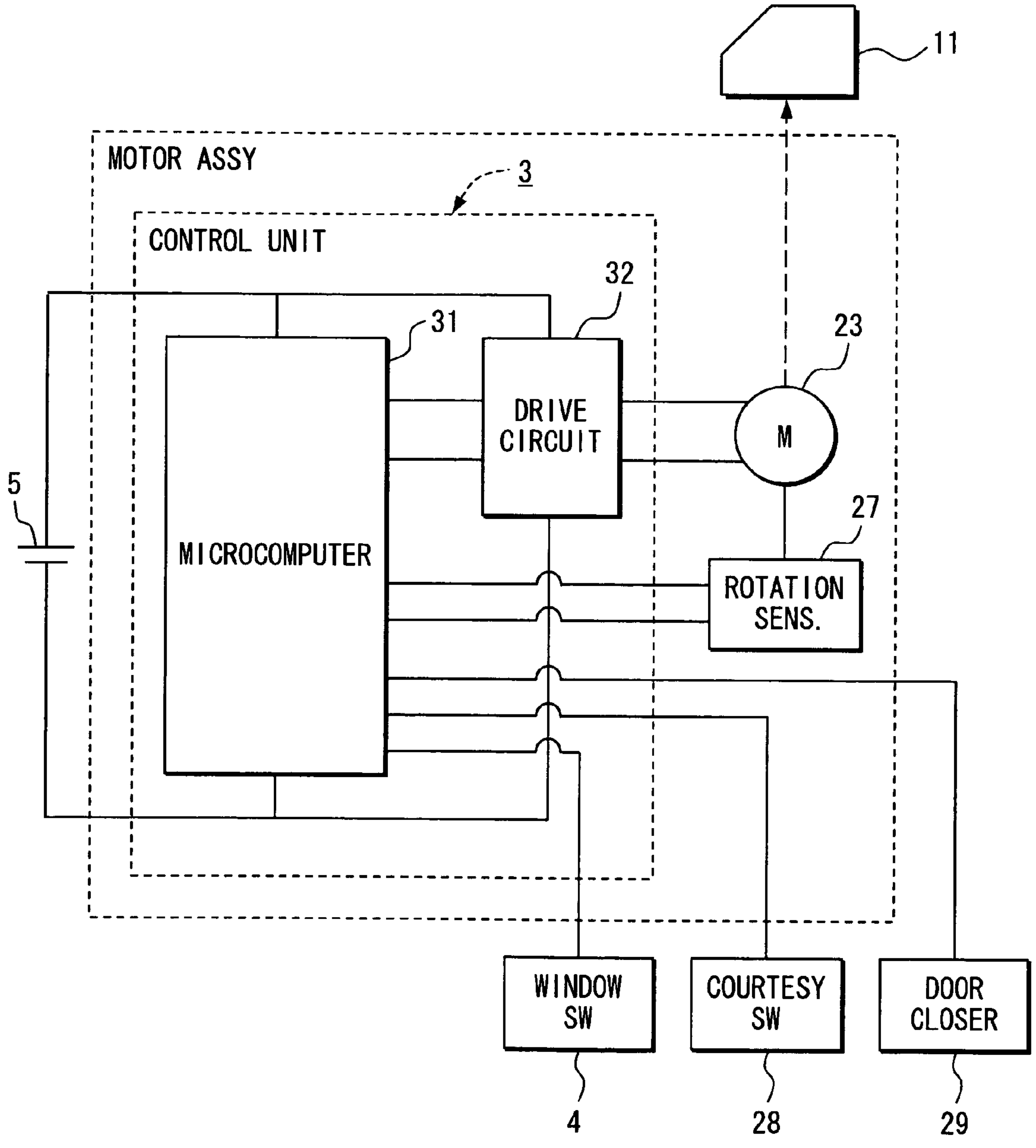
FIG. 2 is a diagram showing an electrical structure of the power window apparatus shown in FIG. 1.

FIG. 1 is a schematic view of a power window apparatus of the present embodiment, and FIG. 2 is a diagram showing an electrical structure of the power window apparatus. In the power window apparatus (closure panel control apparatus) 1 of the present embodiment, an electric motor 23 is rotated to lower or raise a window glass 11, i.e., to execute an opening/closing movement of the window glass 11. The window glass 11 serves as a closure panel (an opening and closing body) provided in a door 10 of the vehicle. The power window apparatus 1 includes a drive unit (drive means) 2, a control unit (control means) 3 and a manipulation switch (a window switch) 4. The drive unit 2 drives the window glass 11 to open and close the same. The control unit 3 controls the operation of the drive unit 2. An occupant of the vehicle operates the manipulation switch 4 to provide an operational command.

The drive unit 2 of the present embodiment includes upper and lower brackets 21*a*, 21*b*, a guide rail 22, the motor 23, an endless tape 24 and a slider 25. The upper and lower brackets 21*a*, 21*b* are installed to an inner panel 10*a* of the door 10. The guide rail 22 is installed to connect between the upper and lower brackets 21*a*, 21*b*. The motor 23 is installed to the lower bracket 21*b*. The tape 24 is placed around the upper bracket 21*a* and a sprocket connected to an output shaft of the motor 23. The slider 25 is installed to the tape 24 and is slidably guided by the guide rail 22. A carrier plate 11*a*, which supports a lower end portion of the window glass 11, is installed to the slider 25.

The motor 23 of the present embodiment can rotate in both of normal and reverse directions upon receiving the electric power from the control unit 3. In the drive unit 2 of the present embodiment, when the motor 23 is rotated in the normal direction or reverse direction, the rotational force of the motor 23 is transmitted to the tape 24 through the sprocket. Thereby, the tape 24 is rotated by the rotational force to guide the slider 25 along the guide rail 22 in the vertical direction. When the slider 25 is guided in the vertical direction along the guide rail 22, the slider 25 moves the window glass 11 in the vertical direction through the carrier plate 11*a*. The drive unit 2 drives the motor 23 to execute the opening/closing movement of the window glass 11.

A rotation sensing device (rotation sensor) 27 is provided integrally in the motor 23 (i.e., in the motor assembly also referred to as motor assy) of the present embodiment. The rotation sensing device 27 outputs pulse signals (a speed measurement signal and a rotational speed signal), which are synchronized with the rotation of the motor 23, to the control unit 3. The rotation sensing device 27 of the present embodiment senses a change in the magnetism of a magnet, which is rotated together with the output shaft of the motor 23, through use of a plurality of Hall elements. With the above construction, the rotation sensing device 27 outputs the pulse signals, which are synchronized with the rotation of the motor 23. That is, the pulse signal is outputted every predetermined moving distance of the window glass 11 or every predetermined rotational angle of the motor 23. In this way, the rotation sensing device 27 can output the signal that corresponds to the moving speed of the window glass 11, which is generally proportional to the rotational speed of the motor 23. As will be described latter, a microcomputer 31 of the control unit 3 senses the operational position of the window glass 11 based on this pulse signal.

In the present embodiment, the Hall elements are used in the rotation sensing device 27. However, the present invention is not limited to this construction. Specifically, in place of the Hall elements, an encoder may be used in the rotation sensing device 27. Furthermore, in the present embodiment, the rotation sensing device 27 is provided integrally in the motor 23. However, the present invention is not limited to this construction. For instance, any known means or device may be used to directly measure the operational position and the moving speed of the window glass 11.

The control unit 3 of the present embodiment includes the microcomputer 31 and a drive circuit 32. A necessary electric power is supplied from a battery 5 of the vehicle to the microcomputer 31 and the drive circuit 32. The microcomputer 31 of the present embodiment includes a CPU, memories (e.g., a ROM, a RAM), an input circuit and an output circuit. The CPU, the memories, the input circuit and the output circuit are interconnected through a bus line. The structure of the microcomputer 31 is not limited to the above described one. For example, a DSP or a gate array may be used to construct the microcomputer 31.

The microcomputer 31 drives the motor 23 in the normal direction or the reverse direction through the drive circuit 32 based on a manipulation signal outputted from the manipulation switch 4 to execute the opening/closing movement of the window glass 11. Furthermore, the microcomputer 31 can sense pinching of an object between an upper end portion of the window glass 11 and a window frame based on pulse signals, which are received from the rotation sensing device 27. When the pinching of the object is sensed, the microcomputer 31 drives the motor 23 in the opening direction through the drive circuit 32 to open, i.e., to lower the window glass 11. Therefore, the microcomputer 31 of the present embodiment functions as a storage means and a pinching sensing means.

The drive circuit 32 of the present embodiment includes FET's and changes a polarity of the electric power supplied to the motor 23 based on the input signal from the microcomputer 31. Specifically, when the drive circuit 32 receives a normal rotation command signal from the microcomputer 31, the drive circuit 32 supplies the electric power to the motor 23 to rotate the motor 23 in the normal direction. In contrast, when the drive circuit 32 receives a reverse rotation command signal from the microcomputer 31, the drive circuit 32 supplies the electric power to the motor 23 to rotate the motor 23 in the reverse direction. Alternatively, the drive circuit 32 may be constructed to change the polarity using a relay circuit. Furthermore, the drive circuit 32 may be integrated in the microcomputer 31.

The microcomputer 31 senses leading edges and trailing edges (pulse edges) of the received pulse signals. The microcomputer 31 computes the rotational speed (rotational period) of the motor 23 based on intervals (periods) of the pulse edges and senses the rotational direction of the motor 23 based on a phase difference of each pulse signal. That is, the microcomputer 31 indirectly computes the moving speed of the window glass 11 based on the rotational speed (rotational period) of the motor 23 and determines the moving direction of the window glass 11 based on the rotational direction of the motor 23. Furthermore, the microcomputer 31 counts the pulse edges. This pulse count value is incremented or decremented in response to the opening/closing movement of the window glass 11. The microcomputer 31 determines the operational position of the window glass 11 based on the degree of the pulse count value. Furthermore, the microcomputer 31 stores the rotational speed data of the motor 23 as learning data.

In the present embodiment, after the writing (storing) of the learning data through the initialization process described below, the microcomputer 31 renews, i.e., updates the learning data every time the window glass 11 is driven in the closing movement in the normal operational state. In the present embodiment, except the case where the pinching is detected, the learning data is updated even at the time of applying an influential external force, which may possibly affect the rotational speed data, to the window glass 11, such as at the time of traveling at a high speed, the time of freezing and/or the time of traveling along a rough road while reflecting such a state.

In the present embodiment, the learning data is updated even in the case where the influential external force is applied, so that the learning is frequently executed. In this way, it is always possible to maintain the learning data, which is adapted to the use situation. Thereby, it is possible to reduce occurrence of an erroneous detection of the pinching. However, the structure is not limited to this. For example, the learning data may be updated only in the case where the external force is not applied like in the previously proposed case.

In this case, it may be determined whether the external force is applied based on, for example, a sensor input. However, when the chance of learning is increased, the learning data is updated to limit the erroneous sensing of the pinching in the closing movement of the window glass 11. Therefore, the determination process based on the output of the sensor can be eliminated. In this way, it is possible to simplify the entire structure, and it is possible to limit the cost increase.

The manipulation switch 4 of the present embodiment is a rocker switch, which is operable in two steps and includes an opening switch, a closing switch and an automatic switch. When the occupant operates the manipulation switch 4, a command signal for executing the opening/closing movement of the window glass 11 is outputted from the manipulation switch 4 to the microcomputer 31.

More specifically, when the manipulation switch 4 is manipulated in one step toward one end side thereof, the opening switch is turned on. Thus, a normal opening command signal for executing a normal opening movement of the window glass 11 (for executing an opening movement of the window glass 11 only through a period of manipulating the manipulation switch 4) is outputted from the manipulation switch 4 to the microcomputer 31. Furthermore, when the manipulation switch 4 is manipulated in one step toward the other end side thereof, the closing switch is turned on. Thus, a normal closing command signal for executing a normal closing movement of the window glass 11 (for executing a closing movement of the window glass 11 only through a period of manipulating the manipulation switch 4) is outputted from the manipulation switch 4 to the microcomputer 31.

Furthermore, when the manipulation switch 4 is manipulated in two steps toward the one end side thereof, the opening switch and the automatic switch are both turned on. Thus, an automatic opening command signal for executing an automatic opening movement of the window glass 11 (for executing an opening movement of the window glass 11 all the way to a full open position regardless of whether the manipulation of the manipulation switch 4 is stopped) is outputted from the manipulation switch 4 to the microcomputer 31. Also, when the manipulation switch 4 is manipulated in two steps toward the other end side thereof, the closing switch and the automatic switch are both turned on. Thus, an automatic closing command signal for executing an automatic closing movement of the window glass 11 (for executing a closing movement of the window glass 11 all the way to a full close position regardless of whether the manipulation of the manipulation switch 4 is stopped) is outputted from the manipulation switch 4 to the microcomputer 31.

The microcomputer 31 drives the motor 23 through the drive circuit 32 throughout the period of receiving the normal opening command signal from the manipulation switch 4 (throughout the period of manipulating the manipulation switch 4) to execute the normal opening movement of the window glass 11. In contrast, the microcomputer 31 drives the motor 23 through the drive circuit 32 throughout the period of receiving the normal closing command signal from the manipulation switch 4 (throughout the period of manipulating the manipulation switch 4) to execute the normal closing movement of the window glass 11.

Furthermore, when the microcomputer 31 receives the automatic opening command signal from the manipulation switch 4, the microcomputer 31 drives the motor 23 through the drive circuit 32 to execute the automatic opening movement of the window glass 11 all the way to the full open position. Also, when the microcomputer 31 receives the automatic closing command signal from the manipulation switch 4, the microcomputer 31 drives the motor 23 through the drive circuit 32 to execute the automatic closing movement of the window glass 11 all the way to the full close position.

The microcomputer 31 monitors occurrence of the pinching of the object by the window glass 11 when the closing movement of the window glass 11 (normal closing movement and automatic closing movement) is executed. Specifically, when the pinching occurs, the moving speed of the window glass 11 and the rotational speed of the motor 23 are reduced (lengthening of the rotational period). Thus, the microcomputer 31 of the present embodiment always monitors the change in the rotational speed of the motor 23.

The microcomputer 31 first senses start of the pinching based on the change in the rotational speed. Then, when the microcomputer 31 senses a predetermined amount of change in the rotational speed since the time of detecting the start of the pinching, the microcomputer 31 determines, i.e., confirms that the pinching has occurred. Then, when the pinching is confirmed, the microcomputer 31 drives the motor 23 in the reverse direction to release the pinched object from the window glass 11, so that the window glass 11 is opened by a predetermined amount. Alternatively, when the occurrence of the pinching is confirmed, the microcomputer 31 may stop the further closing movement of the window glass 11 by stopping the motor 23 to enable releasing of the pinched object from the window glass 11.

Furthermore, a door state signal (a door open state signal or a door close state signal), which indicates an open state or close state of the door 10, is generated from, for example, a switch (serving as a door state sensing means for sensing the open sate or the close state of the door 10), which is provided in the door 10. More specifically, in the present embodiment, the open state or close state of the door 10 is sensed based on a signal outputted from a courtesy switch 28 and/or a door closer 29 provided at the door 10. Therefore, at least one of the signal of the courtesy switch 28 and the signal of the door closer 29 serves as the door state signal. Accordingly, it is not required to provide a dedicated sensor, and thereby the structure of the present embodiment can be implemented at the simple and low cost manner. The door state signal is supplied to the microcomputer 31 and is used in the initialization process described latter.

Figure 3:
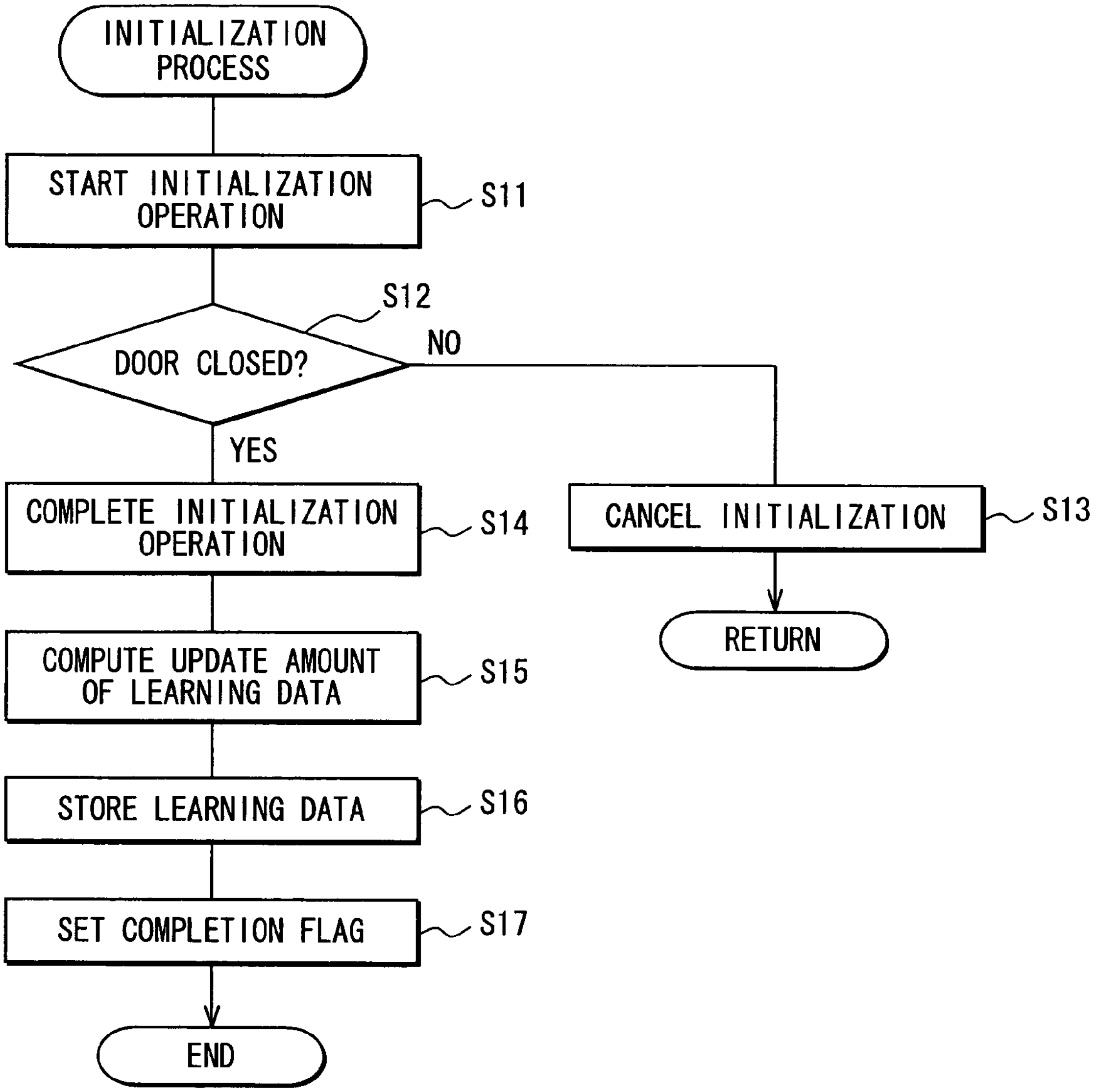
FIG. 3 is a flowchart showing an initialization process according to the embodiment.
Figure 4:
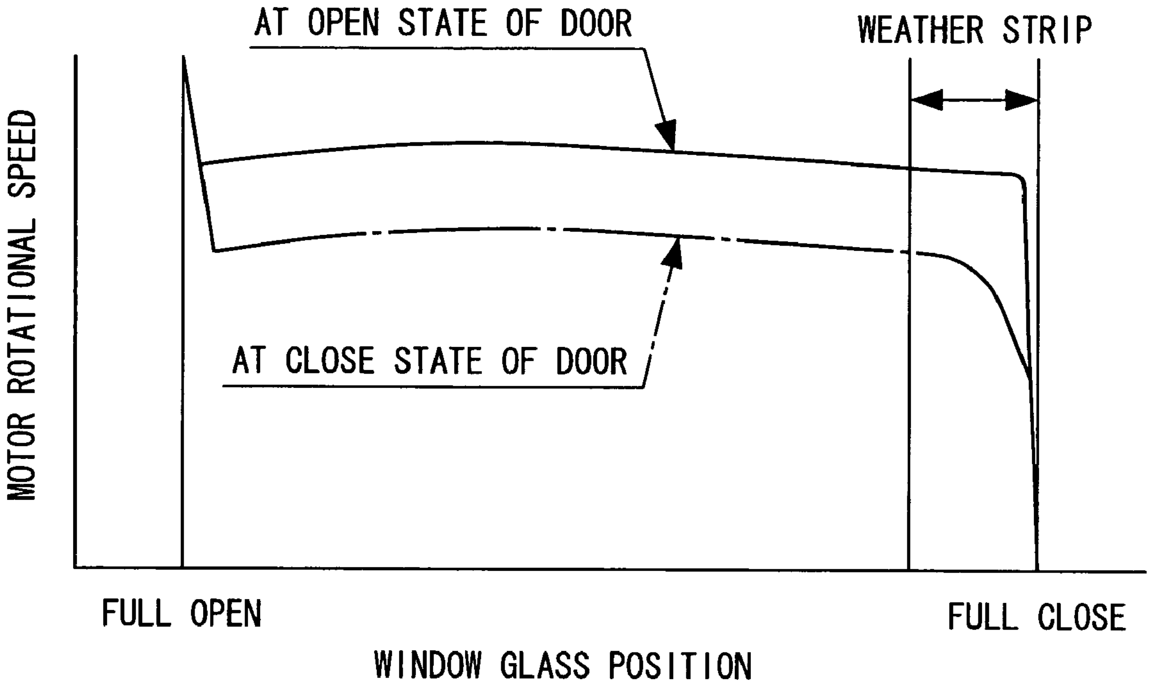
FIG. 4 is a chart showing a relationship between a window glass position and a rotational speed of an electric motor of the power window apparatus.

Next, the initialization process of the power window apparatus 1 of the present embodiment will be described with reference to FIGS. 3 and 4. A flow of the initialization process of the power window apparatus 1 according to the present embodiment will be described with reference to FIG. 3. First, at step S11, an initialization operation is started. Then, at step S12, it is determined whether the door 10 is in the close state. When it is determined that the door 10 is not in the close state at step S12 (i.e., NO at step S12), the process proceeds to step S13. At step S13, the initialization is canceled, and the process returns to the begging.

This is due to the following reason. That is, as shown in FIG. 4, in the case of the door, such as the sashless door, the slide resistance of the window glass differs between the door open state and the door close state. Therefore, when the learning data is updated by the initialization in the door open state, the erroneous sensing of the pinching may possibly occur. That is, in the door open state, the initialization is canceled to avoid the updating of the learning data. Therefore, the initialization takes place only in the door close state to update the learning data. Particularly, in the door close state, the moving speed of the window glass 11 is reduced by the slide resistance of the weather strip unlike the door open state. Therefore, the door open state and the door close state cannot be handled in the same manner.

As described above, the initialization is canceled in the door open state to avoid the updating of the learning data. Therefore, the initialization and the updating of the learning data can be performed only in the learning state where the speed change caused by the weather strip, which only occurs at the time of driving the window glass 11 in the door close state, is learned. Therefore, it is possible to limit shipment of the vehicle having the power window apparatus that is erroneously initialized in the door open state at the factory or at the automobile dealer. Thus, the erroneous sensing of the pinching can be effectively limited. Furthermore, the erroneous sensing of the pinching caused by the weather strip can be effectively limited. Therefore, the dead zone (insensible zone) can be reduced in comparison to the previously proposed product.

When it is determined that the door 10 is in the close state at step S12 (YES at step S12), the process proceeds to step S14 to execute the initialization (thereby to complete the initialization operation). Then, at step S15, the update amount of the learning data is computed. The computation of the update amount of the learning data may use a threshold value, which is obtained as follows. That is, for example, the closing movement of the window glass 11 may be executed continuously or intermittently for a predetermined number of times (i.e., n times where n is a natural number equal to or larger than 1). At this time, the rotational speed ωn, i.e., a number of revolutions per unit time (where n is a natural number equal to or larger than 1) of the motor 23 is computed based on the pulse signals received from the rotation sensing device 27, and the average value thereof may be used as the threshold value.

Furthermore, based on the above rotational speed ωo of the motor 23, a rotational speed difference Δωo is computed every time the pulse edge is sensed. The values of the rotational speed difference Δωo form a data column, in which the values are stored in relation to the pulse count values, respectively. The rotational speed information is stored in the memory as a data column used for the updating of the learning data. In this way, the characteristics of the learning data Δω can be stored for every predetermined moving interval of the window glass 11. Thereby, the detection of the pinching can be made for each of the positions.

Next, the learning data, which is updated, is stored at step S16. Thereafter, a completion flag is set at step S17, and the process is terminated. As described above, the completion flag, which indicates the completion of the initialization process, is set upon the execution of the initialization and the updating of the learning data. The completion flag is used as a prerequisite condition for executing the automatic opening movement of the window glass 11 and for enabling the pinching sensing function. That is, when the completion flag is not set, the automatic opening movement of the window glass 11 and the pinching sensing function cannot be executed. Therefore, it is possible to further limit the shipment of the vehicle having the power window apparatus that is erroneously initialized in the door open state at the factory or the automobile dealer. Thus, the erroneous sensing of the pinching can be effectively limited.

Additional advantages and modifications will readily occur to those skilled in the art. The invention in its broader terms is therefore not limited to the specific details, representative apparatus, and illustrative examples shown and described.

What is claimed is:

1. A window glass control apparatus for a vehicle, comprising:

a drive means for driving a window glass, which is provided at a sashless door of the vehicle, to open and close the window glass relative to the sashless door;

a door state sensing means for sensing an open state or a close state of the sashless door;

a storage means for storing operational information of the window glass;

a pinching sensing means for sensing pinching of an object by the window glass based on the operational information, which is stored in the storage means; and a control means for controlling the drive means, wherein:

the control means includes an initialization processing means for executing initialization, which causes the storage means to store the operational information of the window glass therein in a state where no previous information with respect to the window glass is stored in the storage means;

the initialization processing means cancels the initialization when an open state signal, which indicates the open state of the sashless door, is outputted from the door state sensing means; and the initialization processing means executes the initialization only when a close state signal, which indicates the close state of the sashless door, is outputted from the door state sensing means.

2. The window glass control apparatus according to claim 1, wherein the control means enables automatic closing movement of the window glass when the initialization processing means senses completion of the initialization.

3. The window glass control apparatus according to claim 1, wherein the control means enables sensing of the pinching by the pinching sensing means when the initialization processing means senses completion of the initialization.

4. The window glass control apparatus according to claim 1, wherein the door state sensing means includes a courtesy switch, which is provided in the vehicle, and senses the open state or the close state of the sashless door based on a signal outputted from the courtesy switch.

5. The window glass control apparatus according to claim 1, wherein the door state sensing means includes a door closer, which is provided in the vehicle, and senses the open state or the close state of the sashless door based on a signal outputted from the door closer.

6. The window glass control apparatus according to claim 1, wherein the initialization processing means initializes learning data, which is relevant to the window glass and is stored in the storage means, before the storage means stores the operational information in the state where no previous information is stored in the storage means.

7. The window glass control apparatus according to claim 6, wherein:

the drive means includes an electric motor; and the learning data includes rotational speed data of the electric motor.

8. The window glass control apparatus according to claim 1, wherein the window glass is slidably supported by the sashless door such that a slide resistance of the window glass relative to the sashless door differs between the open state of the sashless door and the close state of the sashless door.

9. The window glass control apparatus according to claim 1, wherein the sashless door is a hinged sashless door.

10. A window glass control apparatus for a vehicle, comprising:

a motor that drives a window glass, which is provided at a sashless door of the vehicle, to open and close the window glass;

a door switch that sends a signal indicating an open state or a close state of the sashless door;

a memory that stores operational information of the window glass;

a pinching sensor that determines pinching of an object by the window glass based on the operational information, which is stored in the memory; and a microcomputer for controlling the motor, wherein the microcomputer executes an initialization, which causes the memory to store the operational information therein in a state where no previous information is stored in the memory, the microcomputer cancels the initialization when an open state signal, which indicates the open state of the sashless door, is outputted from the door switch, and the microcomputer executes the initialization only when a close state signal, which indicates the close state of the sashless door, is outputted from the door switch.

11. The window glass control apparatus according to claim 10, wherein the microcomputer initializes learning data, which is relevant to the window glass and is stored in the memory, before the microcomputer causes the memory to store the operational information in the memory in the state where no previous information is stored in the memory.

12. The window glass control apparatus according to claim 11, wherein the microcomputer updates the learning data every time the window glass is driven to close.

* * * * *

UNITED STATES PATENT AND TRADEMARK OFFICE

CERTIFICATE OF CORRECTION

PATENT NO. : 7,982,589 B2
APPLICATION NO. : 12/219783
DATED : July 19, 2011
INVENTOR(S) : Yutaka Naito et al.

It is certified that error appears in the above-identified patent and that said Letters Patent is hereby corrected as shown below:

Title page

Correct Item (75), as Inventors to read:

Yutaka Naito, Toyohashi (JP); Takahiro Sumiya, Toyohashi (JP)

Signed and Sealed this
Eighteenth Day of October, 2011

David J. Kappos

*Director of the United States Patent and Trademark Office*